Figure 1:
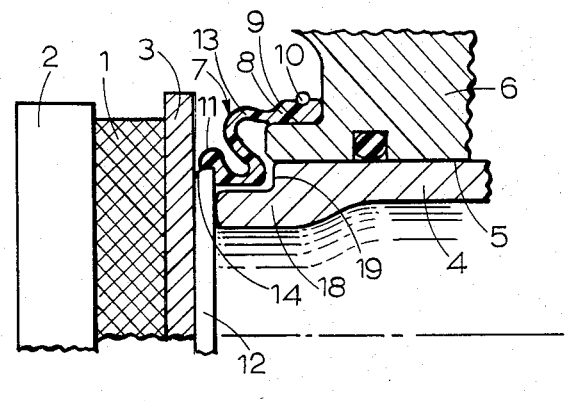

United States Patent [19]

Innocent

[11] Patent Number: 4,506,768

[45] Date of Patent: Mar. 26, 1985

[54] BOOT ASSEMBLY

[75] Inventor: David B. Innocent, Birmingham, England

[73] Assignee: Lucas Industries public limited company, Birmingham, England

[21] Appl. No.: 186,729

[22] Filed: Sep. 12, 1980

Related U.S. Application Data

[63] Continuation of Ser. No. 925,151, Jul. 17, 1978, abandoned.

[30] Foreign Application Priority Data

Jul. 20, 1977 [GB] United Kingdom ............... 30526/77
Jan. 20, 1978 [GB] United Kingdom ................ 2337/78

[51] Int. Cl.$^3$ .............................................. F16D 65/16
[52] U.S. Cl. .................................... 188/370; 74/18.2; 92/168; 277/212 FB
[58] Field of Search ..................... 188/72.4, 72.5, 370, 188/73.1, 366, 369, 264 G; 92/168, 169; 277/73, 212 FB; 74/18.2, 18, 18.1; 403/50, 51

[56] References Cited

U.S. PATENT DOCUMENTS 3,497,038 2/1970 Schrader et al. ................... 188/370
3,528,301 9/1970 Wasmer .............................. 188/370

FOREIGN PATENT DOCUMENTS 2134940 1/1973 Fed. Rep. of Germany ...... 188/370

Primary Examiner—Douglas C. Butler
Attorney, Agent, or Firm—Scrivener Clarke Scrivener and Johnson

[57] ABSTRACT

A boot assembly for preventing ingress of dirt into one end of a bore in a housing in which a piston works usually consists of a first portion sealing against the housing adjacent to the end of the bore, a second portion sealing against the piston and a flexible web connecting the two. To prevent the second portion lifting away from the piston, to which it is conventionally attached by being stretched round a groove at the end of the piston, the boot assembly is combined with a plate, having its outer peripheral edge sealingly connected to the second portion, and an inner face in abutment with the adjacent end of the piston.

2 Claims, 6 Drawing Figures

BOOT ASSEMBLY

This application is a continuation of application Ser. No. 925,151, filed July 17, 1978, now abandoned.

This invention relates to a boot assembly for preventing ingress of foreign matter, for example dirt or water, into one end of a bore in a housing in which a piston is adapted to work, the boot assembly being of the kind comprising a first portion adapted to seal against the housing adjacent to the said one end of the bore, a second portion adapted to seal against the piston, and a flexible impermeable web connecting the first and second portions and which accommodates relative axial movement between the piston and the bore.

Boot assemblies of this kind are commonly used in hydraulic actuators for disc brakes, the piston acting to apply a friction pad assembly to the disc when the brakes are applied. It is very important to prevent any ingress of foreign matter into the hydraulic actuator bore as the piston is extremely vulnerable to seizure.

In known boot assemblies of the kind set forth a seal is provided between the first portion and the housing by means of a rigid clamping ring and a seal is provided between the second portion and the piston by stretching the second portion around a groove or reduced diameter portion formed in the forward end of the piston for this purpose. In spite of the tension of the second portion it may tend to lift away from the surface of the piston at its forward end when the piston approaches the end of its travel as the pads become worn out and extends the boot assembly. In a disc brake the second portion will also be close to the heat generating part of the brake and may therefore tend to deteriorate and lose its resilience more rapidly than other parts of the boot assembly if the brake is overworked. In such a case the boot will be less liable to resist lifting away from the piston surface when the brake is applied. In practice, although the second portion is usually of substantial axial length, moisture and dirt may be able to work its way past the boot assembly and into the housing bore as a result of these effects. Furthermore, the thin chromium plating which is conventionally applied to the disc brake pistons is most likely to suffer damage, if it suffers any at all, at the forward end where the piston, in use, abuts the pad assembly. The combination of moisture trapped in any damage marks and under the boot portion as described, can in some cases cause the plating to lift or peel under the boot second portion and into the housing bore region. If the piston is cup-shaped with its forward end open, this peeling may start on the interior surface where it is less likely to be perfectly formed. If the peeling extends up to the second portion of the boot assembly the seal between the boot assembly and the piston surface will be less efficient and any lifting away when the boot is at full stretch will be more likely to allow moisture or dirt to work its way into the bore, where it will cause corrosion of the piston or interfere with its free sliding.

According to our invention a boot assembly of the kind set forth is combined with a plate having an outer peripheral edge to which the second portion of the boot is sealingly connected, and an inner face forming an abutment face for an adjacent end of the piston.

As the boot assembly is not arranged to be directly secured to the piston, it can be used with a piston which has no groove or reduced diameter portion provided for retaining the boot assembly, which is of benefit in allowing pressed and plastics pistons to be used and booted, and may result in cheaper and more reliable assemblies.

The boot assembly can also be used with a piston which has a reduced diameter portion formed in the forward end of the piston to allow room for the convolutions of the second portion of the boot assembly (rather than to locate the boot in any way as in the known assemblies). Such a piston may be used in a brake assembly where space may be at a premium.

In one construction according to our invention the plate may be imperforate, so that the boot assembly, when assembled with the piston and the housing completely encloses the one end of the piston, thus reducing the risk of damage and or peeling of any plating on the piston.

In another construction the plate may comprise an annulus, or have other perforations, so that the boot assembly, when assembled with the piston and the housing, covers a substantial part of the area of the one end of the piston. This construction also reduces substantially the risk of damage to or peeling of any plating on the piston.

Preferably the plate is rigid and is of metallic construction, but in an alternative construction the plate may be non-metallic and have heat insulating properties. Alternatively the plate may be composite, comprising a metal portion, coated on at least one side with ceramic or other heat insulating material. Preferable the insulating material is located on the side remote from the piston.

The second portion may comprise a thickened lip formed integrally with the flexible web and is preferably of rubber. The second portion may be permanently connected to the plate, for example, by moulding or bonding, or in suitable constructions it may be sealingly connected but releasable.

The plate may be of planar outline with the second portion bonded to its peripheral edge which may be chamfered to provide a greater bond area so that the bond is more secure. In a modification the plate may be of generally cup-shaped outline having an annular rim which is adapted to encircle the end of the piston and to which the second portion of the boot is connected. The second portion may be bonded to the outer surface of the rim, or it may include an annular groove in which the rim is sealingly received.

In another construction the rim is extended in length and includes an inner rim portion which is adapted to encircle the end of the piston fairly closely, and an outer free end portion of greater diameter which is connected to the second portion. Again the second portion may be bonded to the rim, or include an annular groove in which the outer portion is sealingly received.

In yet another construction the rim is angled and sealingly received in a corresponding groove in the second portion. The rim may be angled such that the tensile force when the boot assembly is axially stretched acts directly along the line of the bonded interface, virtually eliminating the tendency of the second portion to lift away from the rim when the boot assembly is extended.

In the last three constructions the outer edge of the rim may be bent up away from the piston to form a U-shaped rim to which the second portion is connected. This construction is preferable if the connection is releasable.

In an hydraulic actuator boot assembly the plate is preferably of a diameter slightly larger than the piston over which the boot assembly is adapted to be sealed. This ensures that where the actuator forms part of a disc brake there will be no rubber part of the boot assembly trapped between the forward end of the piston and the pad assembly. The plate thus acts as a thrust transmitting member between the piston and the friction pad assembly.

In the construction described an anti-squeal shim comprising a punched out metal sheet may be interposed between the plate and the friction pad assembly. Where the plate is imperforate the plate itself may be locally thickened on its external face to achieve an anti-squeal effect.

Alternatively the plate itself may be apertured to obviate the necessity for a separate anti-squeal shim.

The first portion of the boot assembly is preferably secured against an annular surface of the housing by a rigid clamping ring.

Several embodiments of the invention will now be described with reference to the accompanying drawings, in which:

FIG. 1 is a cross-sectional partial view of a caliper disc brake incorporating a boot assembly; and FIGS. 2, 3, 4, 5 and 6 are similar views to FIG. 1 showing modified boot assemblies.

In the disc brake shown in FIGS. 1 to 6 opposed friction pads 1, of which one only is shown, are adapted to be applied to opposite faces of a brake disc 2. Each pad is secured to a rigid backing plate 3. An actuator piston 4 working in a cylindrical bore 5 of an actuator housing 6 is adapted to urge the friction pad 1 into engagement with the disc 2.

A boot assembly 7 comprises a first portion 8 sealed against a radially outwardly facing cylindrical face 9 of the housing by means of a rigid clamping ring 10, a second portion comprising a thickened lip 11 sealingly bonded to the outer peripheral edge of a metal plate 12, and a resilient web 13 integral with the first portion 8 and the second portion 11. The plate 12 extends over and forms an abutment for the adjacent end of the piston 4 and may be formed from a steel pressing. The exposed face of the plate may then be painted for protection against corrosion.

In all the drawings the piston 4 and boot assembly 7 are shown in their retracted position in which the flexible web 13 has annular convolutions allowing extension of the boot assembly when the piston 4 moves relative to the bore 5 to apply the pad 1 to the disc 2. The plate 12 acts as a thrust transmitting member between the piston 4 and the backing plate 3 and protects the end of the piston from damage.

In the assembly shown in FIG. 1 a chamfered surface 14 is formed at the outer peripheral edge of the plate 12 to provide an increased area for bonding with the second portion 11.

Figure 2:
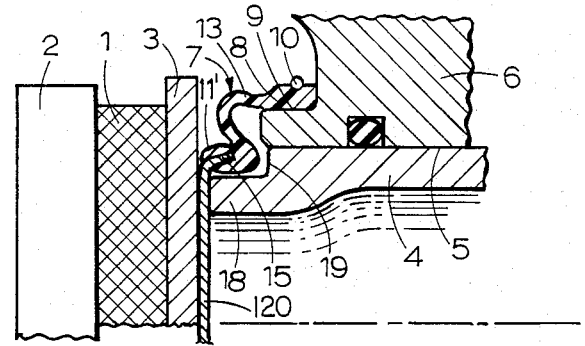

In the modified assembly shown in FIG. 2 the outer edge of the plate 120 is of generally cup-shaped outline having an angled annular rim 15 and the second portion 11' includes an annular groove in which the rim 15 is received and bonded. The angle of the rim 15 is arranged such that when the boot assembly 7 is fully extended on a brake application, the tensile force tends to act directly along the line of the bonded interface between the rim and second portion 11'. Thus any tendency for the second portion to peel away from the rim will be virtually zero even if the bond is slightly imperfectly formed.

In the modification shown in FIG. 3 the plate 121 is again generally cup-shaped with an annular rim 16 adapted to encircle the end of the piston 4 fairly closely, and the second portion 11 is bonded to the outer surface of the rim 16. In an alternative embodiment the rim 16 could be of larger diameter and the second portion 11 could have an annular groove in which the rim is received and bonded.

Figure 3:
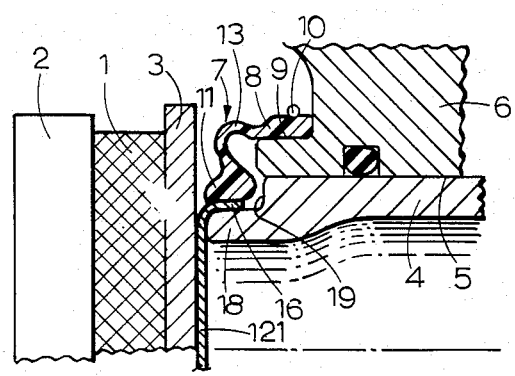
Figure 4:
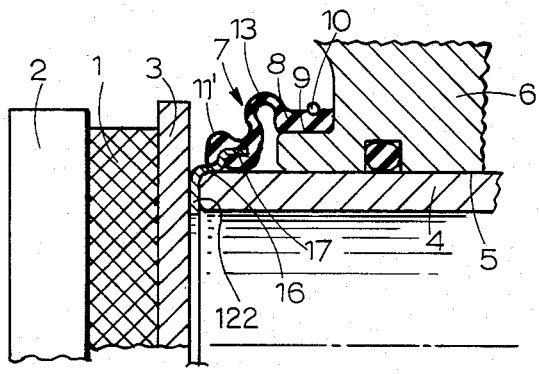

The boot assembly 7 shown in FIG. 4 is a modification of the assembly shown in FIG. 3, in which the rim 16 of the plate 122 is extended in length and includes an outer end portion 17 of increased diameter which is received in a corresponding annular groove in the second portion 11'. The inner rim portion encircles the end of the piston 4 fairly closely.

Figure 5:
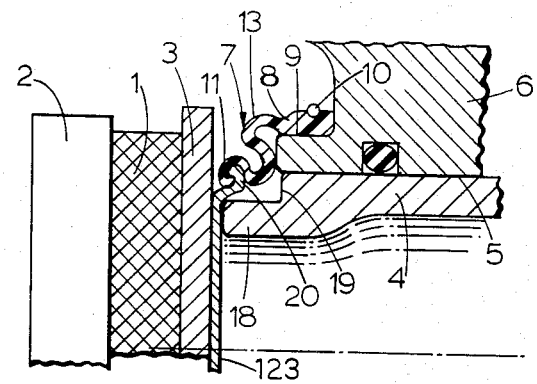

In a further modification shown in FIG. 5 the outer edge of the rim portion of the plate 123 may be bent up towards the backing plate to form a U-shaped rim 20. The second portion 11 is then moulded to be a sealing fit over the rim, and is so constructed and arranged that when the boot assembly is extended during brake application, the seal between the boot and the plate is enhanced. This construction is preferred where a releasable construction between the boot and the plate is required.

It will be noted that the piston 4 shown in all the Figures except 4 is formed with a reduced diameter portion 18 at its forward end. The annular shoulder 19 formed thereby does not act to locate the boot assembly in any way as in conventional boot arrangements but the reduced diameter portion 18 provides extra space for the annular convolutions of the flexible web 13. For this kind of piston it may be preferable to use an imperforate plate, as the piston is more liable to retain any moisture or foreign matter behind the "shoulders" formed by the reduced diameter portion, and thus be subject to worse corrosion than a piston without this feature.

In the embodiment shown in FIG. 4 the piston has no reduced diameter portion and can conveniently and easily be formed as a cup-shaped pressing. In this embodiment extra space is necessary to accommodate the convolutions of the web 13, but the disadvantages of providing extra space may be outweighed by the advantage of an easily formed plain cup-shaped piston if sufficient brake installation space is available, and the plate 122 may be annular as illustrated.

In any of the embodiments described a non-metallic plate may be used. In this case the plate preferably has heat-insulating properties so that the actuator is protected from the heat generated during braking.

Figure 6:
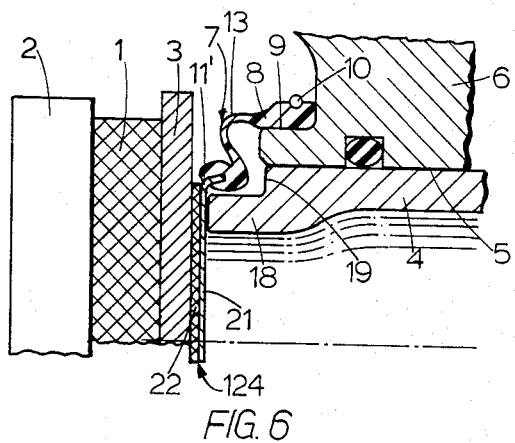

Alternatively a composite plate 124 may be used as shown in FIG. 6 comprising a metal portion 21, coated on one side with ceramic or other heat-insulating material 22. Preferably the insulating material covers only the plane portion of the metal, and is located on the side of the metal remote from the piston.

An anti-squeal shim, usually comprising a punched out metal sheet, may be interposed between the plate 12 and the pad backing plate 3 in any of the above described embodiments, and in the embodiment of FIGS. 1 to 3 the plate 12 may itself be locally thickened to achieve an anti-squeal effect. In the embodiments where a perforated plate is used it may be more convenient to aperture the plate itself, so it acts as an anti-squeal shim. In the latter cases locating means may be provided to ensure that the boot assembly is orientated such that the trailing edge of the pad 1 contacts the disc 2 first when the brake is applied.

I claim:

1. A piston and cylinder assembly comprising a housing provided with a bore, a piston working in said bore and having a first end projecting from one end of said bore, and a boot assembly for preventing ingress of foreign matter into said one end of said bore, wherein said boot assembly comprises a plate, said plate comprising a portion of planar outline having an inner face forming an abutment face for said first end of said piston and in freely separable engagement therewith, an outer thrust transmitting face on the opposite side of said plate from said inner face, and an outer peripheral edge; an annular rim having a first portion integrally connected at one end with said peripheral edge, said first portion encircling said first end of said piston, said rim having a second portion integrally connected at one end to the other end of said first portion, said second portion being of greater diameter than said first portion and having its other end free; and a sealing boot comprising a first portion sealing against said housing adjacent to said one end of said bore by means of a clamping ring, a second portion sealingly and permanently connected to said second portion of said rim, and a flexible impermeable web connecting said first portion and said second portion of the boot.

2. A piston and cylinder assembly according to claim 1 wherein said second portion of said annular rim is bent up away from said first portion to form a U-shape, said second portion of said boot assembly being sealingly and permanently connected to said U-shaped second portion of said rim.

* * * * *